(12) United States Patent
Sawai et al.

(10) Patent No.: US 12,740,498 B2
(45) Date of Patent: Sep. 22, 2026

(54) TRACTOR

(71) Applicant: KUBOTA CORPORATION, Osaka (JP)

(72) Inventors: Takashi Sawai, Sakai (JP); Norita Tottori, Sakai (JP); Katsumi Yanagihara, Sakai (JP); Kazuya Kiyama, Sakai (JP); Hiroyuki Kawamura, Sakai (JP); Shinichiro Minami, Sakai (JP); Ryo Kumai, Sakai (JP); Mami Fujii, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 323 days.

(21) Appl. No.: 18/419,598

(22) Filed: Jan. 23, 2024

(65) Prior Publication Data

US 2024/0155962 A1 May 16, 2024

Related U.S. Application Data

(63) Continuation of application No. PCT/JP2022/014055, filed on Mar. 24, 2022.

(30) Foreign Application Priority Data

Jul. 30, 2021 (JP) ................................ 2021-125986
Jul. 30, 2021 (JP) ................................ 2021-125987
Jul. 30, 2021 (JP) ................................ 2021-125988

(51) Int. Cl.
*A01B 59/06* (2006.01)
*A01B 63/10* (2006.01)
(Continued)

(52) U.S. Cl.
CPC .......... *A01B 63/112* (2013.01); *A01B 59/067* (2013.01); *A01B 63/1006* (2013.01); *B62D 49/06* (2013.01)

(58) Field of Classification Search
CPC . A01B 59/067; A01B 63/1006; A01B 63/112; B62D 49/06
See application file for complete search history.

(56) References Cited

U.S. PATENT DOCUMENTS

2010/0071919 A1* 3/2010 Muzzy ................ A01B 63/112 172/9
2022/0225556 A1 7/2022 Nakayama et al.

FOREIGN PATENT DOCUMENTS

JP 2018-42530 A 3/2018
JP 2020-191843 A 12/2020
(Continued)

OTHER PUBLICATIONS

Official Communication issued in International Patent Application No. PCT/JP2022/014055, mailed on Jun. 14, 2022.

*Primary Examiner* — Matthew R Buck
(74) *Attorney, Agent, or Firm* — Keating & Bennett, LLP

(57) ABSTRACT

A tractor includes a hydraulic lifting and lowering driver to lift and lower a three-point linkage, a load detector to swing according to a traction load of an implement, and a mechanical linkage to transmit a swing amount of the load detector to the lifting and lowering driver. The mechanical linkage includes a first linkage on one side in a right-left direction of a vehicle body frame and interlockingly linked with the load detector, a second linkage on the other side in the right-left direction of the vehicle body frame and interlockingly linked with the lifting and lowering driver, and an operation cable interlockingly linking the first linkage and the second linkage.

23 Claims, 10 Drawing Sheets

(51) Int. Cl.
*A01B 63/112* (2006.01)
*B62D 49/06* (2006.01)

(56) References Cited

FOREIGN PATENT DOCUMENTS

| | | | | | |
|---|---|---|---|---|---|
| WO | WO-2018168147 | A1 * | 9/2018 | ........... | A01B 63/112 |
| WO | 2020/241811 | A1 | 12/2020 | | |

* cited by examiner

B
F
E
3(SF)
1
16
4(SF)
5
14
2
73
9
10
22
7
8
6(SF)
46
43
15
45
44
18
47
21
13
6A
17
25
23
19
20a
20
20b
12

17
19
15
73
8
8
9
58
60
28
48(50)
61
59
45(22)
39
21
18
18
48A
37
X
20b(20)
56
44
25
53
25
55
46(22)
49
63
47A
74
65
81
41
67
78
6(SF)
75(68)
38
82
13
47B
20a(20)
83
43
44
44
L
R
47(22)
6A
20a(20)
43

20b(20)
47A
81
47(22)
47B
45(22)
48
51
21
50
42
60
48A
53
57
41
38
49
61
58
59
39
56
52
X
55
40
37
25
30
35
27
26
10
36
33
29
6
9
F
B

45(22)
48(50)
48A
21
56
51
41
50
52
57
55
53
58
60
47A
59
61
49
81
40
X
37
47B
47(22)
83

73
72
78
74
79
28
64a
32b
63
64
32
32a
34
71
70
69
71
28a
28b
46(22)
31
75
76
77
67
68
79
75a
66
62
65
47A
47B
47(22)

28
73
31
75
74
77
78
66
68
79
67
79
76
75a
72
62
65
10
46(22)
6
47A(47)

25
30
35
36
29
33
34
32
64
64a
28
28a
73
27
31
74
63
46(22)
67
77
47A
62
20b(20)
21
47A
47B
48
53
56
57
55
47(22)
58
45(22)
52
50

TRACTOR

CROSS REFERENCE TO RELATED APPLICATIONS

This application claims the benefit of priority to Japanese Patent Application Nos. 2021-125986, 2021-125987 and 2021-125988 filed on Jul. 30, 2021 and is a Continuation Application of PCT Application No. PCT/JP2022/014055 filed on Mar. 24, 2022. The entire contents of each application are hereby incorporated herein by reference.

BACKGROUND OF THE INVENTION

1. Field of the Invention

The present invention relates to a tractor including a three-point linkage to which an implement is movably attached.

2. Description of the Related Art

One example of the above-described tractor is configured to perform plowing work and the like with an implement, such as a plow, attached to a three-point linkage and including a mechanical linkage for draft control converting changes in traction load acting on the implement in work into the lifting and lowering operation amount and transmitting the lifting and lowering operation amount to a lifting and lowering driver. Conventionally, in some tractors, the changes in traction load have been transmitted to the mechanical linkage by an operation cable (see, JP 2020-191843 A, for example).

The tractor described in JP 2020-191843 A has been configured so that the whole mechanical linkage is collectively provided on one side in the right-left direction of a vehicle body and that the operation cable extends toward the vehicle body backward side, and then bent in an arc shape to extend back toward the vehicle body forward side to be connected to a relay linkage.

Another example of the above-described tractor includes is configured to perform plowing work and the like with an implement, such as a plow, attached to a three-point linkage and including a mechanical linkage for draft control converting changes in traction load acting on the implement in work into the lifting and lowering operation amount and transmitting the lifting and lowering operation amount to a lifting and lowering driver. Conventionally, in some tractors, the mechanical linkage has transmitted the changes in traction load by an operation cable (see JP 2020-191843 A, for example).

The tractor described in JP 2020-191843 A has been configured so that the whole mechanical linkage is collectively provided on one side in the right-left direction of a vehicle body and that the operation cable extends toward the vehicle body backward side, is bent in an arc shape, and then extends back toward the vehicle body forward side to be connected to a relay linkage.

Yet another example of the above-described tractor is configured to perform plowing work and the like with an implement, such as a plow, attached to a three-point linkage and including a mechanical linkage for draft control converting changes in traction load acting on the implement in work into the lifting and lowering operation amount and transmitting the lifting and lowering operation amount to a hydraulic lifting and lowering driver. Conventionally, some tractors have included an operation linkage interlockingly linking a plurality of links as the mechanical linkage (see, JP 2018-42530 A, for example).

The tractor described in JP 2018-42530 A has been configured so that the operation linkage is provided to be position-shifted to the machine body forward side with respect to a lift arm.

SUMMARY OF THE INVENTION

The above-described first example conventional configuration is configured so that the changes in traction load are transmitted to the lifting and lowering driver through the operation cable. Therefore, the conventional configuration has advantages of simplifying the configuration and preventing the occurrence of chattering to enable smooth transmission, as compared with those transmitting the changes in traction load by connecting a plurality of links, for example.

However, the operation cable is routed to extend toward the vehicle body backward side, and then bent in an arc shape to extend back toward the vehicle body forward side, and therefore the operation cable is bent with a small curvature radius. In such a routing, an excessive force is applied to the portion bent with a small curvature radius in a push and pull operation, which has posed a risk of a failure to accurately perform the transmission of the changes in traction load by the operation cable.

Therefore, it has been desired to prevent a decrease in the accuracy in transmitting the changes in traction load while taking the advantages of using the operation cable.

The above-described second example conventional configuration is configured so that the changes in traction load are transmitted to the lifting and lowering driver through the operation cable. Therefore, the conventional configuration has advantages of simplifying the configuration and preventing the occurrence of chattering to enable smooth transmission, as compared with those transmitting the changes in traction load by interlockingly connecting a plurality of links, for example.

However, the operation cable is routed to extend toward the vehicle body backward side, and then be curved, and therefore the conventional configuration has posed a high risk of contact with the three-point linkage or the like positioned on the vehicle body back side, and thus has had disadvantages, such as a failure to satisfactorily perform the lifting and lowering action.

Therefore, it has been desired to prevent the interruption of the action of the three-point linkage and the like positioned on the vehicle body back side while taking the advantage of using the operation cable.

In the above-described third example conventional configuration, the operation linkage is provided to be position-shifted to the machine body forward side with respect to the lift arm. Therefore, the conventional configuration has been disadvantageous in that an arrangement space is required to provide the operation linkage in front of the lift arm, which increases the size of the vehicle body along the forward and backward direction of the machine body.

Therefore, it has been demanded to achieve a vehicle body that is compact in the forward and backward direction even though the operation linkage for transmitting the changes in traction load to the lifting and lowering driver is provided.

A tractor according to an example embodiment of the present invention includes a vehicle body frame, a three-point linkage connected to a back portion of a vehicle body of the tractor to be swingable upward and downward and allowing the attachment of an implement, a lifting and lowering driver to lift and lower the three-point linkage, a load detector to swing according to a traction load of the implement during ground work performed by the implement while the implement is towed by the vehicle body, and a mechanical linkage to transmit a swing amount of the load detector to the lifting and lowering driver, in which the mechanical linkage includes a first linkage on one side in the right-left direction of the vehicle body frame and interlockingly linked with the load detector, a second linkage on the other side in the right-left direction of the vehicle body frame and interlockingly linked with the lifting and lowering driver, and an operation cable interlockingly linking the first linkage and the second linkage.

According to an example embodiment of the present invention, the swing amount of the load detector is transmitted to the lifting and lowering driver through the operation cable, and therefore the configuration is simple, and no chattering occurs and smooth transmission is likely to be performed. The swing amount of the load detector swinging according to the traction load is transmitted from the first linkage to the second linkage through the operation cable, and then transmitted from the second linkage to the lifting and lowering driver. In this case, the first linkage is provided on one side in the right-left direction of the vehicle body frame and the second linkage is provided on the other side in the right-left direction of the vehicle body frame, and therefore, one end and the other end of the operation cable are spaced in the right-left direction.

As a result, the operation cable is provided to be largely bypassed from one side in the right-left direction toward the other side in the right-left direction of the vehicle body frame, and therefore is bent to make a large turn with a large curvature radius. Thus, an interlocking operation of the operation cable is smoothly performed without difficulty.

This has made it possible to reduce or prevent decreases in accuracy in transmitting the changes in traction load while taking the advantage of using the operation cable.

Preferably, in an example embodiment of the present invention, the first linkage includes a swing operator to swing with swinging of the load detector about a swing axis different from a swing axis of the load detector, and the operation cable includes an end on the load detector side connected to the swing operator.

With this configuration, the load detector and the swing operator swing about axes different from each other, and therefore, the operation of the operation cable with the swing operator is satisfactorily performed while the operation cable is not constrained by swinging and displacing actions of the load detector.

Preferably, in an example embodiment of the present invention, the operation cable extends along the upward-downward direction from a connected point in each of a connection point to the first linkage and a connection point to the second linkage.

With this configuration, the operation cable can be prevented from projecting in the forward and backward direction of the vehicle body, there is little risk of contact of the operation cable with the lift arm, the three-point linkage, or the like, and the lifting and lowering action of the implement can be smoothly performed.

Preferably, in an example embodiment of the present invention, the operation cable reaches the connection point to the second linkage passing through a region behind the vehicle body frame from the connection point to the first linkage.

With this configuration, the operation cable passes through the region behind the vehicle body frame, and thus can be routed along the vehicle body frame, does not unsteadily extend through the air, and can be held in a stable attitude.

A tractor according to an example embodiment of the present invention includes a vehicle body frame, a three-point linkage connected to a back portion of a vehicle body of the tractor to be swingable upward and downward and allowing the attachment of an implement, a lifting and lowering driver to lift and lower the three-point linkage, a load detector to swing according to a traction load of the implement during ground work performed by the implement while the implement is towed by the vehicle body, a mechanical linkage to transmit a swing amount of the load detector to the lifting and lowering driver, a transmission case positioned in the back portion of the vehicle body frame, and a power takeoff (PTO) shaft protruding backward from a back portion of the transmission case to output power to be transmitted to the implement, the mechanical linkage includes an operation cable operable according to the swing amount of the load detector, the operation cable extends downward from a first position higher than the PTO shaft and to a second position higher than the PTO shaft passing through under the PTO shaft.

With this configuration, the swing amount of the load detector is transmitted to the lifting and lowering driver through the operation cable, and therefore the configuration is simple, and no chattering occurs and smooth transmission is likely to be performed. The operation cable extends downward from a first position higher than the PTO shaft and to a second position higher than the PTO shaft passing through under the PTO shaft. The PTO shaft is provided at a low position corresponding to the implement to output power to the implement.

The operation cable extends in this manner, and therefore the operation cable is provided to be largely bypassed by passing through a region under the PTO shaft and is bent to make a large turn with a large curvature radius. Thus, the operation of the operation cable is smoothly performed without difficulty.

This has made it possible to prevent the decrease in the accuracy in transmitting the changes in traction load while taking the advantage of using the operation cable.

Preferably, in an example embodiment of the present invention, the operation cable is routed along the rear wall of the transmission case, a lock is provided in a region under the PTO shaft of the rear wall, and an intermediate portion of the operation cable is locked and held by the lock.

With this configuration, the operation cable is provided along the rear wall of the transmission case and is locked and held by the lock under the PTO shaft, and therefore the operation cable is prevented from unsteadily extending through the air or freely swinging, and can be held in a stable attitude along the rear wall of the transmission case.

Preferably, in an example embodiment of the present invention, the operation cable is provided such that the end on the lifting and lowering driver side in the operation cable is positioned ahead of the rear wall of the transmission case.

With this configuration, the operation cable has the end on the lifting and lowering driver side positioned ahead of the rear wall, and therefore the operation cable extends toward the front side along the rear wall, making it easy to avoid projecting to the back side.

Preferably, in an example embodiment of the present invention, the operation cable is provided such that the end on the load detector side in the operation cable is positioned on one side in the right-left direction of the transmission case and the end on the lifting and lowering driver side in the operation cable is positioned on the other side in the right-left direction of the transmission case.

With this configuration, both the ends are separated in the right-left direction, and therefore the whole operation cable is bent to make a large turn with a large curvature radius without difficulty.

Preferably, in an example embodiment of the present invention, the operation cable is provided such that the end on the load detector side in the operation cable and the end on the lifting and lowering driver side in the operation cable extend along the upward-downward direction.

With this configuration, the operation cable can be prevented from projecting in the forward and backward direction of the vehicle body, there is little risk of contact of the operation cable with the lift arm, the three-point linkage, or the like, and the lifting and lowering action of the implement can be smoothly performed.

A tractor according to an example embodiment of the present invention includes a three-point linkage connected to a back portion of a vehicle body of the tractor to be swingable upward and downward and allowing the attachment of an implement, a lifting and lowering driver to lift and lower the three-point linkage, a load detector to swing according to a traction load of the implement during ground work performed by the implement while the implement is towed by the vehicle body, and a mechanical linkage to transmit the swing amount of the load detector to the lifting and lowering driver, in which the mechanical linkage includes an operation cable to operate according to the swing amount of the load detector and the operation cable is provided such that the upstream end on the load detector side in the operation cable and the downstream end on the lifting and lowering driver side in the operation cable extend along the upward-downward direction and the downstream end is positioned ahead of the upstream end.

According to an example embodiment of the present invention, the swing amount of the load detector is transmitted to the lifting and lowering driver through the operation cable, and therefore the configuration is simpler, and no chattering occurs and smooth transmission is likely to be performed as compared with those in which a plurality of links is connected. In the operation cable, the upstream end on the load detector side and the downstream end on the lifting and lowering driver side extend along the upward-downward direction. Herein, the configuration in which the operation cable extends along the upward-downward direction includes not only a state in which the operation cable extends in the vertical direction or the upward-downward direction close to the vertical direction but a state in which the operation cable is slightly tilted into an oblique attitude. The operation cable is provided such that the downstream end is positioned ahead of the upstream end, and therefore the whole operation cable passes through the vehicle body front side relative to the upstream end. As a result, the operation cable can be prevented from projecting toward the vehicle body backward side, there is little risk of contact with the three-point linkage or the like positioned on the vehicle body back side, and the lifting and lowering action of the implement can be smoothly performed.

This has made it possible to prevent the interruption of the action of the three-point linkage and the like positioned on the vehicle body back side while taking the advantage of using the operation cable.

Preferably, in an example embodiment of the present invention, the mechanical linkage includes a swing operator configured to swing with swinging of the load detector about the swing axis different from the swing axis of the load detector, the upstream end of the operation cable is connected to the swing operator, and the swing operator is swingable upward and downward with a horizontal attitude in between with the operation of the operation cable extending along the upward-downward direction.

With this configuration, the load detector and the swing operator swing about axes different from each other, and therefore such that the operation of the operation cable with the swing operator is satisfactorily performed while the operation cable is not constrained by swinging and displacing actions of the load detector.

When the swing operator is operated to swing with the operation of the operation cable, the swing operator swings upward and downward with the horizontal attitude in between, and therefore the connection point between the operation cable and the swing operator has a small horizontal swing amplitude. As a result, in a place where the outer peripheral (outer cable) on the upper side of the operation cable is supported, a sliding portion (inner cable) and a fixed portion (outer cable) do not strongly rub against each other, and there is little risk of abrasion.

Preferably, in an example embodiment of the present invention, the mechanical linkage includes a first relay arm to which the downstream end in the operation cable is connected, and the first relay arm is swingable upward and downward with a horizontal attitude in between with the operation of the operation cable extending along the upward-downward direction.

With this configuration, when the first relay arm is operated to swing with the operation of the operation cable, the first relay arm swings upward and downward with the horizontal attitude in between, and therefore the connection point between the operation cable and the first relay arm has a small horizontal swing amplitude. As a result, in a place where the outer peripheral (outer cable) on the lower side of the operation cable is supported, the sliding portion (inner cable) and the fixed portion (outer cable) do not strongly rub against each other, and there is little risk of abrasion.

Preferably, in an example embodiment of the present invention, a second relay arm is swingable integrally with the first relay arm, and an interlock interlockingly linked with the second relay arm are provided, and the second relay arm is swingable forward and backward with the operation of the operation cable to move the interlock forward and backward and transmit the swing amount of the load detector to the lifting and lowering driver.

With this configuration, even though the configuration is such that the operation cable is moved in the upward-downward direction, the interlock can be arranged along the forward and backward direction, and the mechanical linkage can be made compact in the upward-downward direction.

Preferably, in an example embodiment of the present invention, the mechanical linkage includes a swing operator to swing interlockingly with the swing of the load detector about the swing axis different from the swing axis of the load detector, a support frame swingably supporting the load detector is provided to be supported by a vehicle body frame, a support swingably supporting the swing operator is provided to be supported by the support frame, the operation cable includes an inner cable and an outer cable externally inserted into and supporting the inner cable to be slidable, and the upstream end of the outer cable is supported by the support such that the position is fixed.

With this configuration, the support is supported by the firmly provided support frame, and the support can stably support the swing support and the upstream end of the outer cable. Further, the support to support the swing support is utilized to support the upstream end of the outer cable, and therefore it is not required to provide a dedicated member for supporting the outer cable and the configuration is simplified by sharing the members.

Preferably, in an example embodiment of the present invention, the operation cable includes the inner cable and the outer cable externally inserted into and supporting the inner cable to be slidable, and a bracket supporting the downstream end of the outer cable is provided to be supported by the vehicle body frame.

With this configuration, the downstream end of the outer cable can be stably supported by the vehicle body frame through the bracket.

A tractor according to an example embodiment of the present invention includes a three-point linkage connected to a back portion of a vehicle body to be swingable upward and downward and allowing the attachment of an implement, a lift arm to operate the three-point linkage to lift and lower, a lifting and lowering driver to lift and lower the lift arm, a load detector to swing according to a traction load of the implement during ground work performed by the implement while the implement is towed by the vehicle body, and a mechanical linkage to transmit the swing amount of the load detector to the lifting and lowering driver, in which the lifting and lowering driver includes an actuator and a controller configured or programmed to control the actuation of the actuator, the mechanical linkage includes an operation linkage to operate the controller in response to a swing amount of the load detector, and the operation linkage extends through a position lateral to the lift arm.

According to an example embodiment of the present invention, the swing amount of the load detector can be transmitted to the controller through the mechanical linkage, and, when the traction load is large, the implement can be lifted to reduce the load. The operation linkage in the mechanical linkage extends through a position lateral to the lift arm, and therefore the lift arm and the operation linkage are positioned in an overlapping state in a side view. More specifically, even when the operation linkage is long in the forward and backward direction, the operation link is positioned by effectively utilizing an empty region of the lateral side of the lift arm, and thus can be compactly arranged as a whole in the forward and backward direction.

Therefore, even though the operation linkage transmitting the changes in traction load to the lifting and lowering driver is provided, the vehicle body is able to be made compact in the forward and backward direction.

Preferably, in an example embodiment of the present invention, the vehicle body includes a protection frame in the back portion of the vehicle body, the protection frame includes right and left legs positioned on the lateral sides of the lift arm, and the operation linkage passes between the lift arm and the legs.

With this configuration, the operation linkage can be protected from the laterally outsides by the legs, and the operation linkage can be prevented from being damaged.

Preferably, in an example embodiment of the present invention, the operation linkage includes an upper swing arm to swing in response to the swing amount of the load detector, a rod extending in the forward and backward direction connected to the upper swing arm and operable to be pushed and pulled in response to the swing of the upper swing arm, and a lower swing arm connected to a lower side of the rod and swinging with the push and pull operation of the rod.

With this configuration, the changing the swing amount of the load detector transmitted to the upper swing arm to the forward and backward movement of the rod extending in the forward and backward direction can ensure the transmission to the lower swing arm even when the rod is long in the forward and backward direction.

Preferably, in an example embodiment of the present invention, an interval adjuster is provided to change and adjust the interval between a connection point between the rod and the upper swing arm and a connection point between the rod and the lower swing arm.

With this configuration, the changing the interval between the connection points by the interval adjuster can change the response sensitivity in the operation of a hydraulic control valve to the swing amount of the load detector.

Preferably, in an example embodiment of the present invention, a lateral spindle extending in the lateral direction and a second swing arm to swing integrally with the upper swing arm about the axis of the lateral spindle are provided, the upper swing arm is operable to transmit the swing amount transmitted to the second swing arm to the rod, and a support bracket rotatably supporting the lateral spindle and a spiral spring to be externally inserted into the lateral spindle and rotating and biasing the upper swing arm to the lowering operation side are provided.

With this configuration, the spiral spring is provided as a biasing structure to perform the biasing to the lowering operation side by effectively utilizing the lateral spindle provided to swingably support the upper swing arm and the second swing arm. The spiral spring can be housed in a more compact shape as compared with a coil spring, making it possible to reduce the size of the whole operation linkage.

Preferably, in an example embodiment of the present invention, the support bracket has an elongated hole extending along the forward and backward direction of the vehicle body, the lateral spindle is supported by the support bracket to be rotatable and movable in the forward and backward direction while passing through the elongated hole, a manually operable adjustment lever is provided on the vehicle body forward side of the lateral spindle, and a strip-shaped operator connecting the adjustment lever and the lateral spindle is provided, the actuation sensitivity to the swing amount of the load detector in the mechanical linkage is changeable and adjustable by operating the adjustment lever to change the position of the lateral spindle in the forward and backward direction, and the operator is foldable such that a back side portion to which the lateral spindle is connected in the operator is positioned outward in the lateral width direction of the vehicle body and a front side portion to which the adjustment lever is connected in the operator is positioned inward in the lateral width direction of the vehicle body.

With this configuration, the changing the position of the lateral spindle forward and backward by the operation of the adjustment lever changes a standby attitude of the lower swing arm when the load detector is in a reference attitude in which the traction load is not detected, so that the actuation sensitivity can be changed.

The operator transmitting the operation of the adjustment lever to the lateral spindle is preferably strip-shaped, and therefore complex connection structures, such as universal joints, are not required as compared with a case of using a rod, for example, and a simple connection structure is sufficient.

The operator can protect the lateral spindle from the soil and the like from ridges or fields by supporting the lateral spindle by the back side portion from the outward side in the lateral width of the vehicle body and the front side portion to which the adjustment lever is connected is positioned inward in the lateral width direction of the vehicle body, and therefore the projection of the vehicle body in the lateral width direction can be reduced as much as possible.

Preferably, in an example embodiment of the present invention, the spiral spring is positioned inward in the lateral width direction of the vehicle body of the back side portion in the operator, and the adjustment lever is positioned outward in the lateral width direction of the vehicle body of the front side portion in the operator.

With this configuration, rationally arranging the spiral spring and the adjustment lever by effectively utilizing an empty region defined by the foldable operator can make the operation linkage compact in the lateral width direction of the vehicle body.

Preferably, in an example embodiment of the present invention, a sliding portion between the operator and the support bracket includes an abrasion-resistant washer.

The upper swing arm, the second swing arm, or the lateral spindle frequently rotates during driving work. This poses a risk of causing abrasion between the rotating portions and the operator or between the rotating portions and the support bracket. This configuration can prevent the above-described abrasion by providing the high abrasion resistant washer to the sliding portion.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
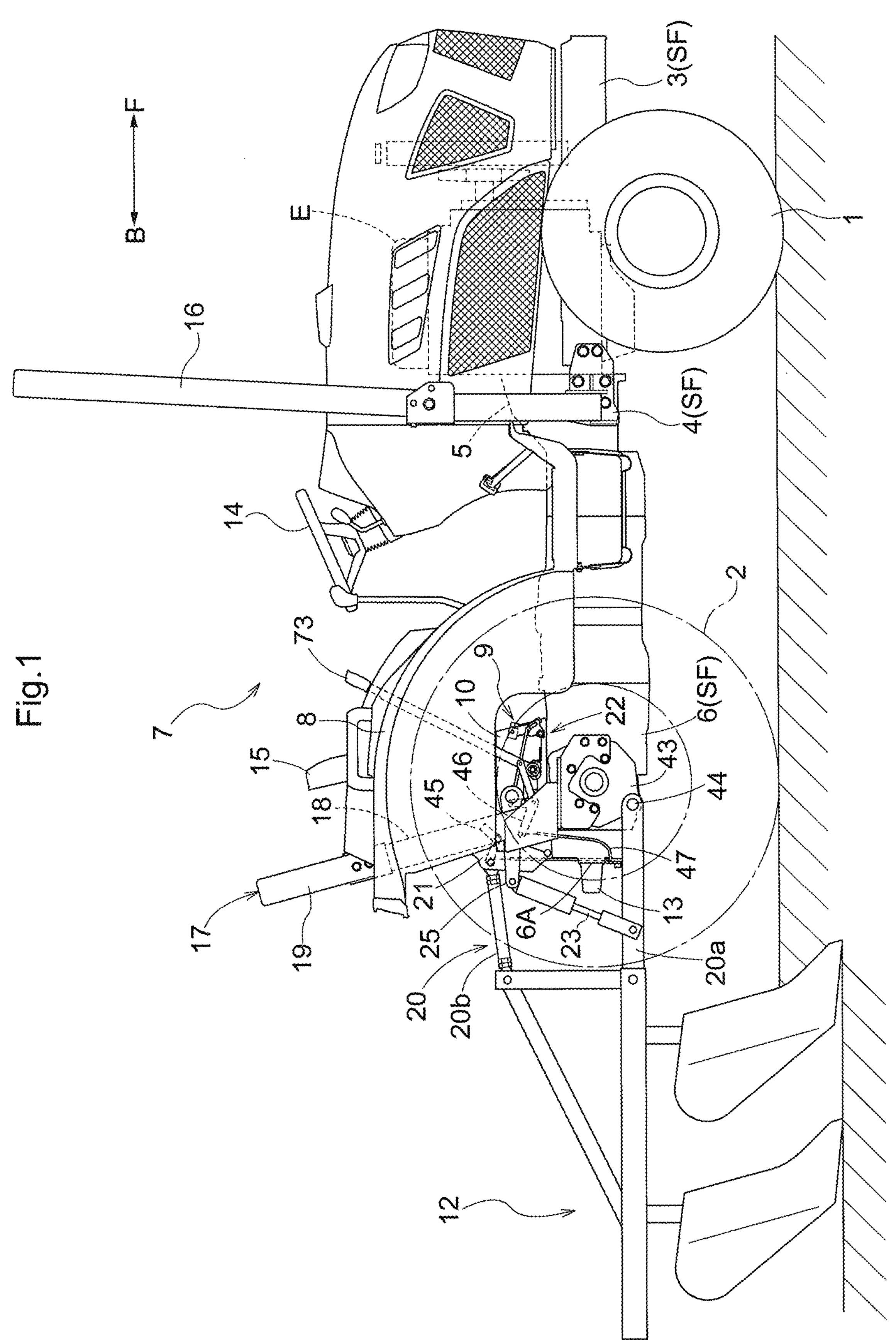
FIG. 1 is a side view of a tractor.

Hereinafter, aspects for implementing example embodiments of the present invention will be described with reference to the drawings. In the drawings, the direction indicated by the arrow "F" indicates the machine body front side, the direction indicated by the arrow "B" indicates the machine body back side, the direction indicated by the arrow "L" indicates the machine body left side, and the direction indicated by the arrow "R" indicates the machine body right side. Therefore, the lateral width direction of the vehicle body corresponds to the right-left direction.

A tractor illustrated in FIG. 1 includes a pair of right and left front wheels 1, a pair of right and left rear wheels 2, a front frame 3, an intermediate frame 4, a clutch housing 5, a transmission case 6, a driving section 7, and a pair of right and left rear fenders 8.

The pair of right and left front wheels 1 is pivotally supported by the front frame 3 arranged in the front of the vehicle body, and is positioned at laterally outer portions of the machine body relative to the front frame 3. The clutch housing 5 is arranged between the front frame 3 and the intermediate frame 4. The transmission case 6 is connected to the back end of the intermediate frame 4. The clutch housing 5 and the transmission case 6 are also used as vehicle body frames of the tractor. More specifically, the front frame 3, the intermediate frame 4, the clutch housing 5, the transmission case 6, and the like are integrally connected to define a vehicle body frame SF of the tractor. A back support case 10 supporting a lifting and lowering driver 9 described below is provided above the transmission case 6.

An engine E is mounted on and supported by the back portion of the front frame 3, and the clutch housing 5 is connected to a lower back end of the engine E. The pair of right and left rear wheels 2 is pivotally supported by the transmission case 6 to be positioned on the right and left outward sides of the transmission case 6.

Although not illustrated, a main clutch and the like are built in the clutch housing 5. The intermediate frame 4 includes a transmission shaft. A main transmission device, an auxiliary transmission device, and the like are built in the transmission case 6. The power of the engine E is transmitted to the pair of right and left front wheels 1 and the pair of right and left rear wheels 2 through the main clutch, the transmission shaft, the main transmission device, the auxiliary transmission device, and the like. A power takeoff (PTO) shaft 13 protrudes backward from the back portion of the transmission case 6 and can output power to be transmitted to the implement 12.

A driving section 7 is arranged in the back portion of the vehicle body, and is configured to allow an operator to ride. The driving section 7 includes a steering wheel 14 and a driver seat 15. The rear fenders 8 are respectively arranged on the right and left laterally outward sides of the machine body of the driver seat 15, and the rear fenders 8 cover the right and left rear wheels 2 from above. The transmission case 6 is arranged below the driver seat 15.

An intermediate portion in the forward and backward direction of the vehicle body includes a front protection frame 16 raised from both the right and left sides of the intermediate frame 4 and extending to bypass above. The back portion of the vehicle body includes a back protection frame 17 positioned behind the driver seat 15, rising from the right and left lateral sides of the transmission case 6, and extending to bypass above.

The back protection frame 17 includes right and left legs 18 and an upper arch 19 rising from the transmission case 6, and is shorter than the front protection frame 16.

A three-point linkage 20 is connected to the back portion of the transmission case 6 to be swingable upward and downward. The three-point linkage 20 includes right and left lower links 20*a* and a top link 20*b* at the center between the right and left sides and movably (e.g., lifting and lowering) supports the implement 12. The implement 12 illustrated in FIG. 1 preferably is a plow, for example. As the implement 12, the implement 12 of a towed type, such as a disc harrow, a cultivator, a subsoiler, and a rotary, for example, can be attached but the implement 12 is not limited to the above.

Right and left lift arms 25 are provided which suspend and support the right and left lower links 20*a* in the three-point linkage 20 through the right and left lift rods 23.

A hydraulic lifting and lowering driver 9 configured to lift and lower the three-point linkage 20 with the implement 12 in a connected state, a load detector 21 configured to swing according to a traction load of the implement 12 during ground work performed by the implement 12 while the implement 12 is towed by the vehicle body, and a mechanical linkage 22 transmitting the swing amount of the load detector 21 to the lifting and lowering driver 9 are provided.

The lifting and lowering driver 9 includes a hydraulic cylinder 26 as an actuator driving the right and left lift arms 25 to swing in the upward-downward direction, a hydraulic control valve 27 as a controller configured or programmed to control the supply and the discharge of hydraulic oil of the hydraulic cylinder 26, a height setting lever 28 setting the control target height of the implement 12, a valve operation mechanism 29 interlocking a spool 27A of the hydraulic control valve 27 by the operation of the height setting lever 28 and the operation of the mechanical linkage 22, a feedback linkage 30 interlocking the spool 27A with the right and left lift arms 25, and the like. The hydraulic control valve 27 includes, in an inside thereof, a biasing structure (not illustrated) to bias the spool 27A to return to the lowering position of the vehicle body forward side. The height setting lever 28 is supported by the back support case 10 to be swingable forward and backward about the axis of a lateral lever spindle 31 and extends above the rear fender 8 on the right lateral side of the driver seat 15.

Figure 9:
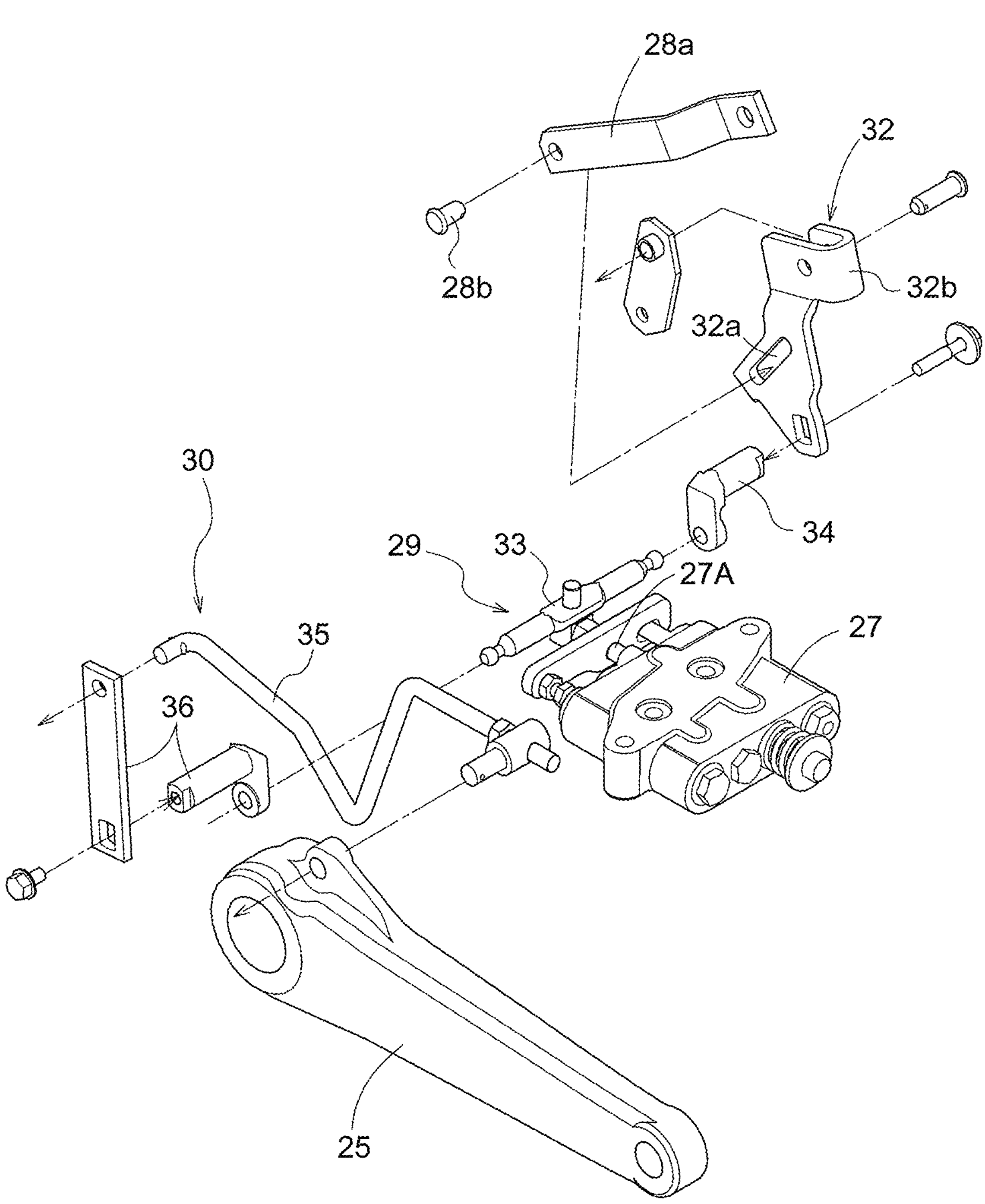
FIG. 9 is an exploded perspective view illustrating a valve operation mechanism.
Figure 10:
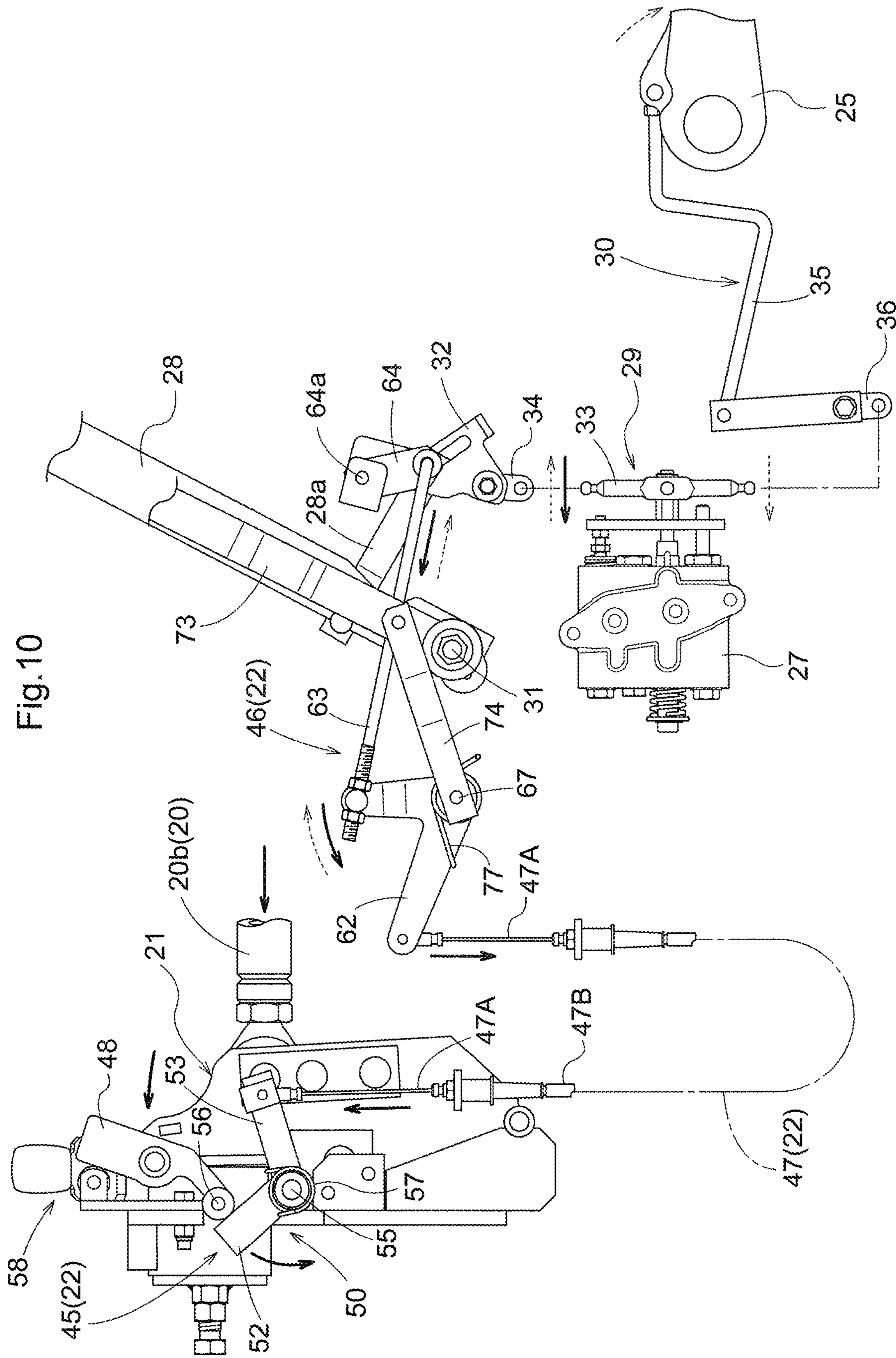
FIG. 10 is a linkage system diagram illustrating the linkage configuration of the mechanical linkage.

As illustrated in FIGS. 9 and 10, the valve operation mechanism 29 includes an operation arm 32 swingable by the operation of the height setting lever 28 and the operation of the mechanical linkage 22, a balance arm 33 supported to be swingable forward and backward about the longitudinal axis by the spool 27A of the hydraulic control valve 27, an operator 34 operated to swing with the swing of the operation arm 32 and movably locked to one end of the balance arm 33, and the like.

The valve operation mechanism 29 moves the spool 27A of the hydraulic control valve 27 from the neutral position to the lifting position or the lowering position interlocking with the swing operation of the height setting lever 28. The valve operation mechanism 29 moves the spool 27A in response to the operation of the mechanical linkage 22.

The feedback linkage 30 includes a linkage link 35 extending out from the left lift arm 25 to the vehicle body front side, an operator 36 locking-acting on the other end of the balance arm 33 through the linkage link 35, and the like. When the implement 12 reaches the target height, the feedback linkage 30 moves the spool 27A of the hydraulic control valve 27 from the lifting position or the lowering position to the neutral position interlocking with the reaching.

The operation arm 32 includes an elongated hole 32*a* extending along the swing direction. An interlocking section 28*a* extends forward and downward from the height setting lever 28. The interlocking section 28*a* includes a pin 28*b* entering the elongated hole 32*a*. When the height setting lever 28 is operated to the height increasing side (backward side), the operation arm 32 swings backward through the pin 28*b*, so that the spool 27A is operated to the lifting position. When the lift arm 25 lifts to a position corresponding to the set height of the height setting lever 28 by the actuation of the hydraulic cylinder 26, the operation of the feedback linkage 30 returns the spool 27A to the neutral position, so that the lift arm 25 is maintained at a set height suitable for tilling work.

When the operation arm 32 is operated to be pulled backward due to the increase in the traction load by the operation of the mechanical linkage 22 described later, the elongated hole 32*a* allows the swing to the backward side, so that the lift arm 25 can be operated to lift.

Figure 5:
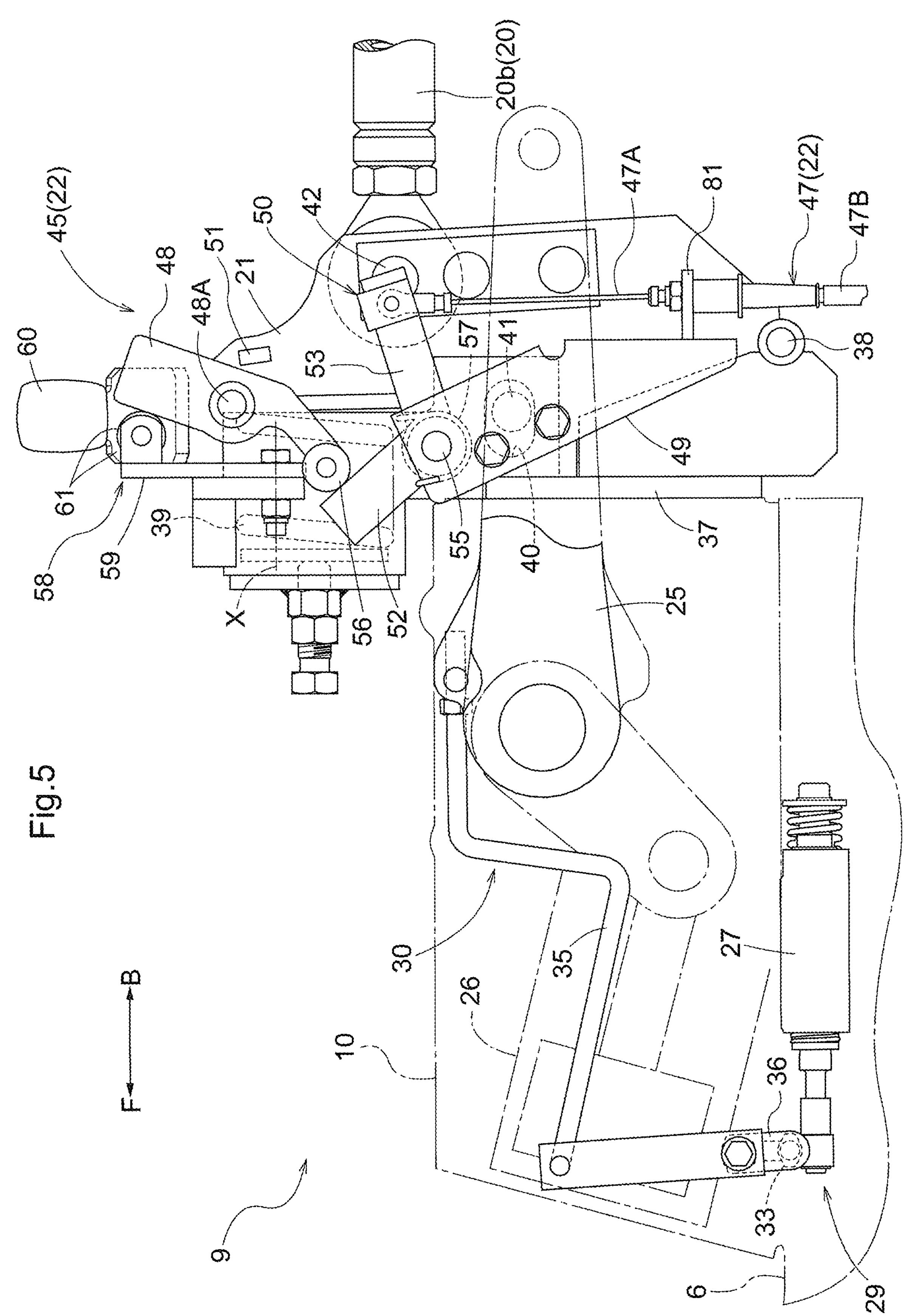
FIG. 5 is a left side view of a principal portion illustrating the configurations of the lifting and lowering driver and the mechanical linkage.
Figure 6:
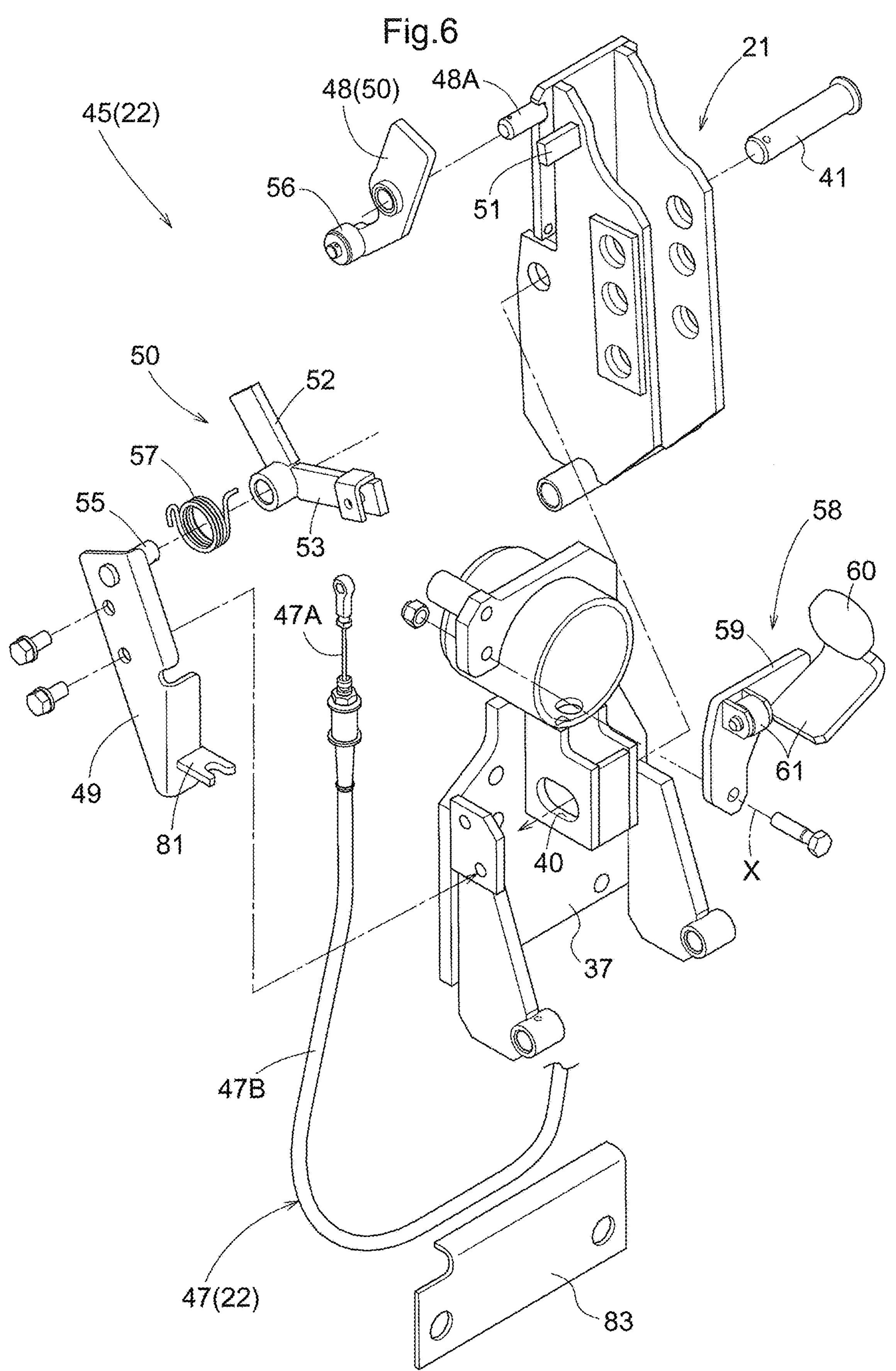
FIG. 6 is an exploded perspective view of a principal portion illustrating the configuration of the mechanical linkage.

As illustrated in FIGS. 5 and 6, the load detector 21 is supported by a back frame 37 fixed to the back end of the back support case 10 to be swingable and displaceable in the forward and backward direction through a lateral spindle 38 in a lower portion. The load detector 21 is biased to swing to the vehicle body backward side by a coil spring 39 provided in the front side. The load detector 21 is limited in the forward-and-backward swing range by a limiting mechanism including an elongated hole 40 located in the back frame 37 and a pin 41 provided in the load detector 21.

As illustrated in FIG. 5, the front end of the top link 20*b* of the three-point linkage 20 is connected to the load detector 21 through a connecting pin 42. As illustrated in FIG. 1, the front ends of the right and left lower links 20*a* are connected to the right and left brackets 43 provided in the back end of transmission case 6 through right and left connecting pins 44, respectively. With this connection structure, the traction load in tilling work acts on load detector 21 through the top link 20*b*.

When the traction load becomes large, the load detector 21 swings to be displaced from a reference attitude (standby state) to the vehicle body front side against the biasing force of the coil spring 39 interlocking with an increase in the traction load and swings to be displaced to the vehicle body back side and returns to the reference attitude by the biasing force of the coil spring 39 interlocking with a decrease in the traction load.

Figure 4:
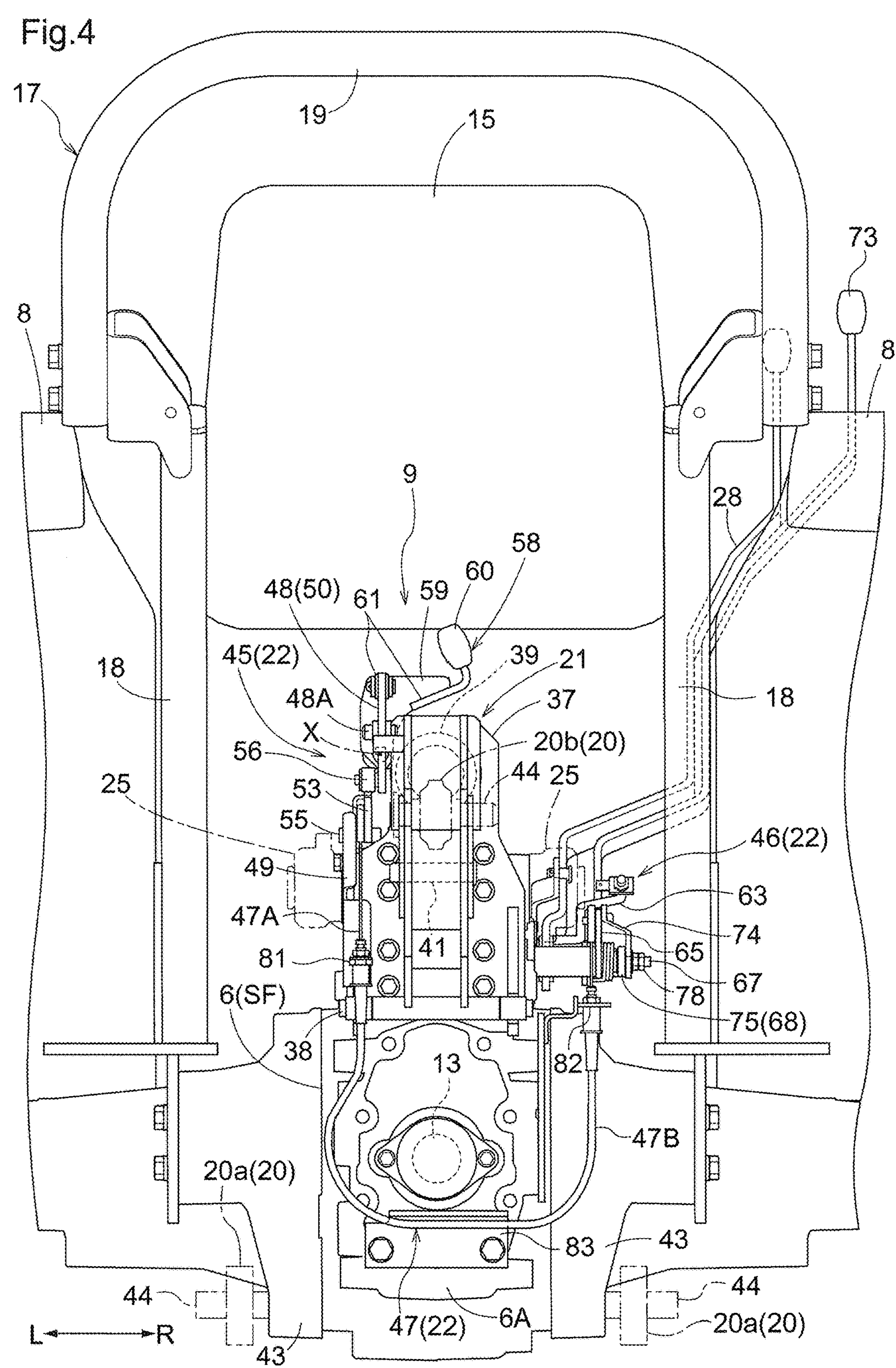
FIG. 4 is a back view of a principal portion illustrating the configurations of the lifting and lowering driver and the mechanical linkage.

The mechanical linkage 22 is configured to transmit the swing displacement by the traction load of the load detector 21 to the operation arm 32 of the valve operation mechanism 29. As illustrated in FIG. 4, the mechanical linkage 22 includes a first linkage 45 provided on the left side as one side in the right-left direction of the vehicle body frame SF and interlockingly linked with the load detector 21, a second linkage 46 provided on the right side as the other side in the right-left direction of the vehicle body frame SF and interlockingly linked with the lifting and lowering driver 9, and an operation cable 47 interlockingly linking the first linkage 45 and the second linkage 46.

The first linkage 45 is described.

As illustrated in FIGS. 5, 6, and 10, the first linkage 45 includes an interlock 48 provided in a left side portion in an upper portion of the load detector 21 and configured to swing interlockingly with the load detector 21, and a swing operator 50 supported to be swingable about the lateral axis by a bracket 49 as a support fixed to the back frame 37.

The interlock 48 preferably has a strip shape extending in the upward-downward direction and is supported by the load detector 21 such that an intermediate portion in the upward-downward direction is swingable about the axis of a lateral spindle 48A. A receiving member 51 is provided in a backward side portion of a swing pivot of the interlock 48 in the load detector 21. When the load detector 21 swings forward, the load detector 21 is received by the receiving member 51, and the interlock 48 interlockingly swings forward.

The swing operator 50 includes an upper arm 52 and a lower arm 53 and includes a plate body with a substantially L-shape in a side view. The swing operator 50 is swingably supported by the bracket 49 through a lateral spindle 55 in an intermediate portion. The bracket 49 is connected and fixed to the back frame 37. An abutting roller 56 supported by the downstream end of the interlock 48 is configured to be able to abut on the upper arm 52 with the swing to the front side of the interlock 48, and the end on the load detector 21 side of the operation cable 47 is connected to the swing end of the lower arm 53.

The swing operator 50 is rotated and biased in a direction where the upper arm 52 approaches the interlock 48 by a spiral spring 57 mounted to the spindle 55. Thus, in an initial state in which no traction load is applied, the upper arm 52 abuts on the interlock 48.

When the load detector 21 swings forward from the standby position by the traction load, the interlock 48 and the upper arm 52 interlockingly swing forward, and the lower arm 53 swings upward and operates the operation cable 47 to be pulled upward. When no traction load is applied, the state returns to the initial state. The lower arm 53 is configured to swing upward and downward with a horizontal attitude in between with the operation of the operation cable 47 extending along the upward-downward direction.

The first linkage 45 includes a change amount adjustment mechanism 58 configured to change the relative displacement amount of the interlock 48 relative to the swing displacement of the load detector 21 in two stages. As illustrated in FIGS. 3 to 6, the change amount adjustment mechanism 58 includes a base 59 supported to be rotatable about an axis X extending in the forward and backward direction by the back frame 37, a grip operation section 60 operating the base 59 to swing, and an actuation regulator 61 supported by the base 59. The actuation regulator 61 can be switched with the rotation of the base 59 between a state of being positioned in a moving region of the interlock 48 (state as illustrated in FIGS. 4, 5) and a state of being positioned in a place deviated from the moving region.

In a state in which the base 59 is rotated counterclockwise in FIG. 4 about the axis X extending in the forward and backward direction from the state illustrated in FIGS. 4 and 5, so that the actuation regulator 61 is deviated from the moving region, the interlock 48 swings integrally with the load detector 21. In a state in which the actuation regulator 61 is positioned in the moving region, a portion above the spindle 48A of the interlock 48 abuts on the actuation regulator 61 during swing, increasing the operation amount of the interlock 48. Thus, the operation amount transmitted to the operation arm 32 to the displacement amount of the load detector 21 can be changed according to a difference of the hardness of the soil from fields and the like, for example.

The second linkage 46 is described.

As illustrated in FIGS. 2 to 4, 7, and 10, the second linkage 46 includes a linkage 62 having a substantially L-shape in a side view, to one end of which the operation cable 47 is connected, a push and pull rod 63 extending in the forward and backward direction as an interlock connected to the other end of the linkage 62 and transmitting the operation amount by being operated to be pushed and pulled in response to the swing of the linkage 62, and an actuating arm 64 as a lower swing arm connected to the back end of the push and pull rod 63 and interlockingly swinging with the push and pull. The actuating arm 64 is rotatably supported by the operation arm 32 in the valve operation mechanism 29.

As illustrated in FIG. 4, the second linkage 46 extends through a position lateral to the lift arm 25. The second linkage 46 is provided to pass between the right lift arm 25 and the right leg 18 of the back protection frame 17.

The linkage 62 is integrally formed into a substantially L-shape with a first relay arm 65 to which a downstream end in the operation cable 47 is connected and a second relay arm 66 swinging integrally with the first relay arm 65. The linkage 62 is supported by a support bracket 68 to be swingable about the axis of a lateral spindle 67 provided in an intermediate portion.

The operation cable 47 is connected to the swing end of the first relay arm 65 and the front end of the push and pull rod 63 is connected to the swing end of the second relay arm 66. When the linkage 62 swings through the operation cable 47 in response to the swing of the load detector 21, the push and pull rod 63 is operated, so that the actuating arm 64 swings corresponding to the operation amount according to the swing amount of the load detector 21. The operation arm 32 swings with the swing of the actuating arm 64.

Figure 2:
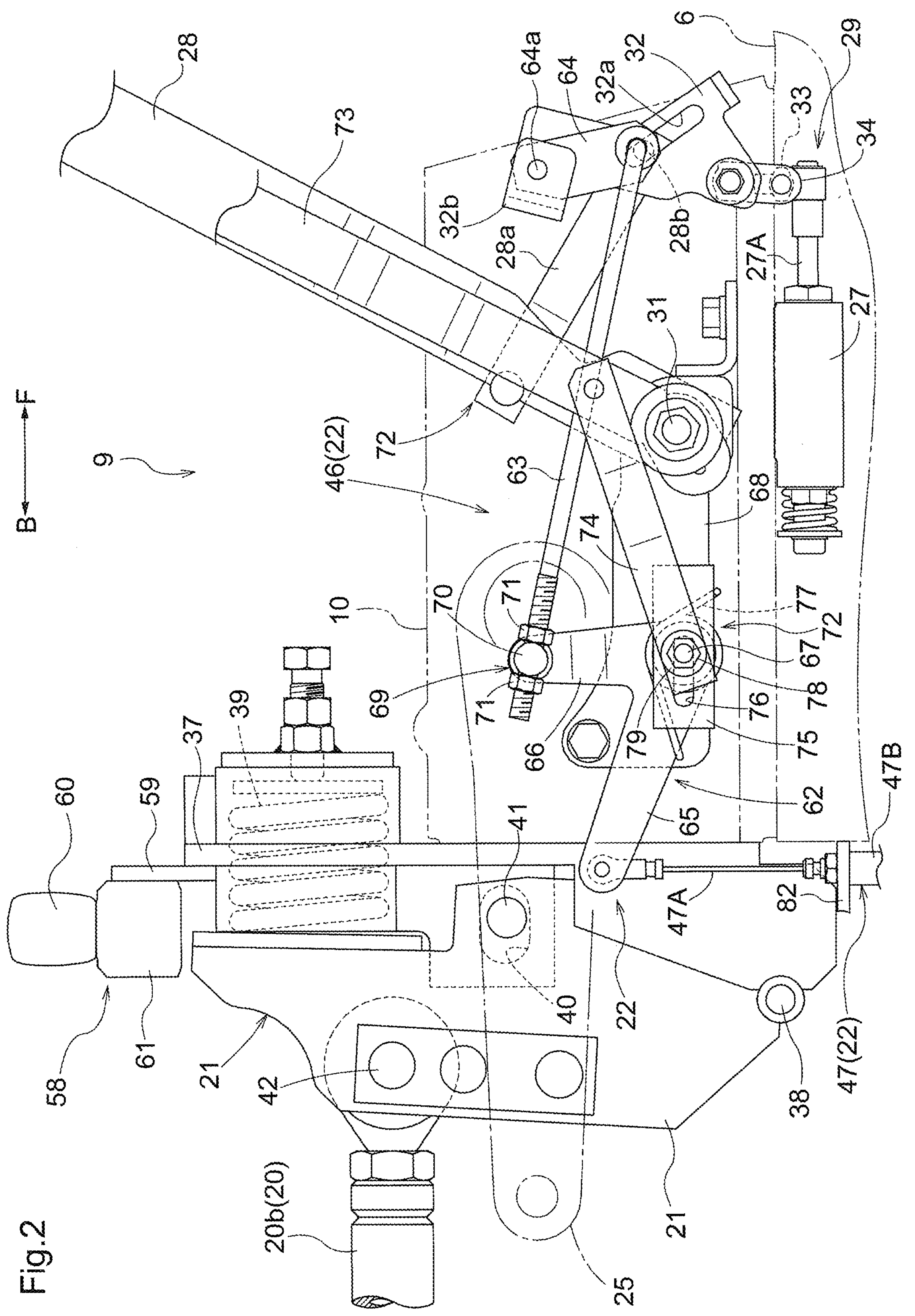
FIG. 2 is a right side view of a principal portion illustrating the configurations of a lifting and lowering driver and a mechanical linkage.
Figure 7:
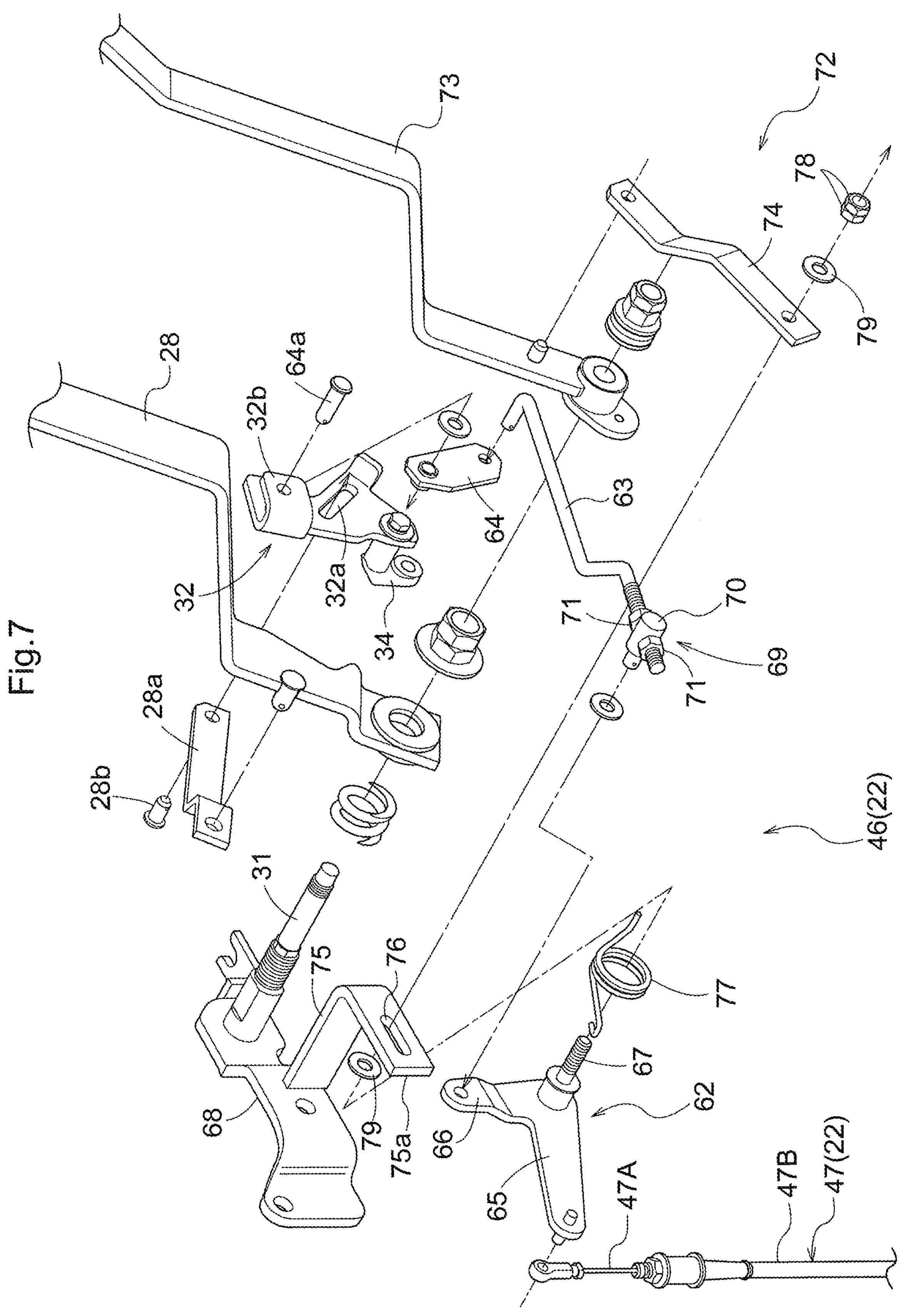
FIG. 7 is an exploded perspective view of a principal portion illustrating the configuration of the mechanical linkage.

As illustrated in FIGS. 2, 7, a screw type interval adjuster 69 is provided which can change and adjust the interval between a connection point between the push and pull rod 63 and the second relay arm 66 and a connection point between the push and pull rod 63 and the actuating arm 64. Specifically, a screw portion is provided in the front of the push and pull rod 63, and the screw portion is provided to be inserted through a cylindrical connection tool 70 supported to be rotatable about the lateral axis by the second relay arm 66.

Nuts 71 are mounted to both the front and back side portions of the connection tool 70 of the screw portion of the push and pull rod 63. The interval between the connection point between the push and pull rod 63 and the second relay arm 66 and the connection point between the push and pull rod 63 and the actuating arm 64 can be changed by loosening the front and back nuts 71 to move the push and pull rod 63 forward and backward, and the position can be fixed by tightening the nuts 71 on both the sides. The back end of the push and pull rod 63 is rotatably and pivotally connected to the actuating arm 64 in a state of being folded at a substantially 90° in plan view.

As illustrated in FIGS. 2 and 7, a sensitivity adjustment mechanism 72 is provided which adjusts the actuation sensitivity when the spool 27A is interlocked with the load detector 21. The sensitivity adjustment mechanism 72 includes a sensitivity adjustment lever 73 provided on the right side of the driver seat 15, an operator 74 extending over the lateral spindle 67 of the linkage 62 from the sensitivity adjustment lever 73, a support bracket 75 on the vehicle body side supporting the lateral spindle 67 such that the position can be changed, and the like. The sensitivity adjustment lever 73 is supported to be swingable forward and backward by the back support case 10 with the lever spindle 31 shared with the height setting lever 28 as a pivot and extends above the rear fender 8 on the right lateral side of the driver seat 15. The lever spindle 31 includes a friction retainer retaining the sensitivity adjustment lever 73 at an optional operating position.

Figure 3:
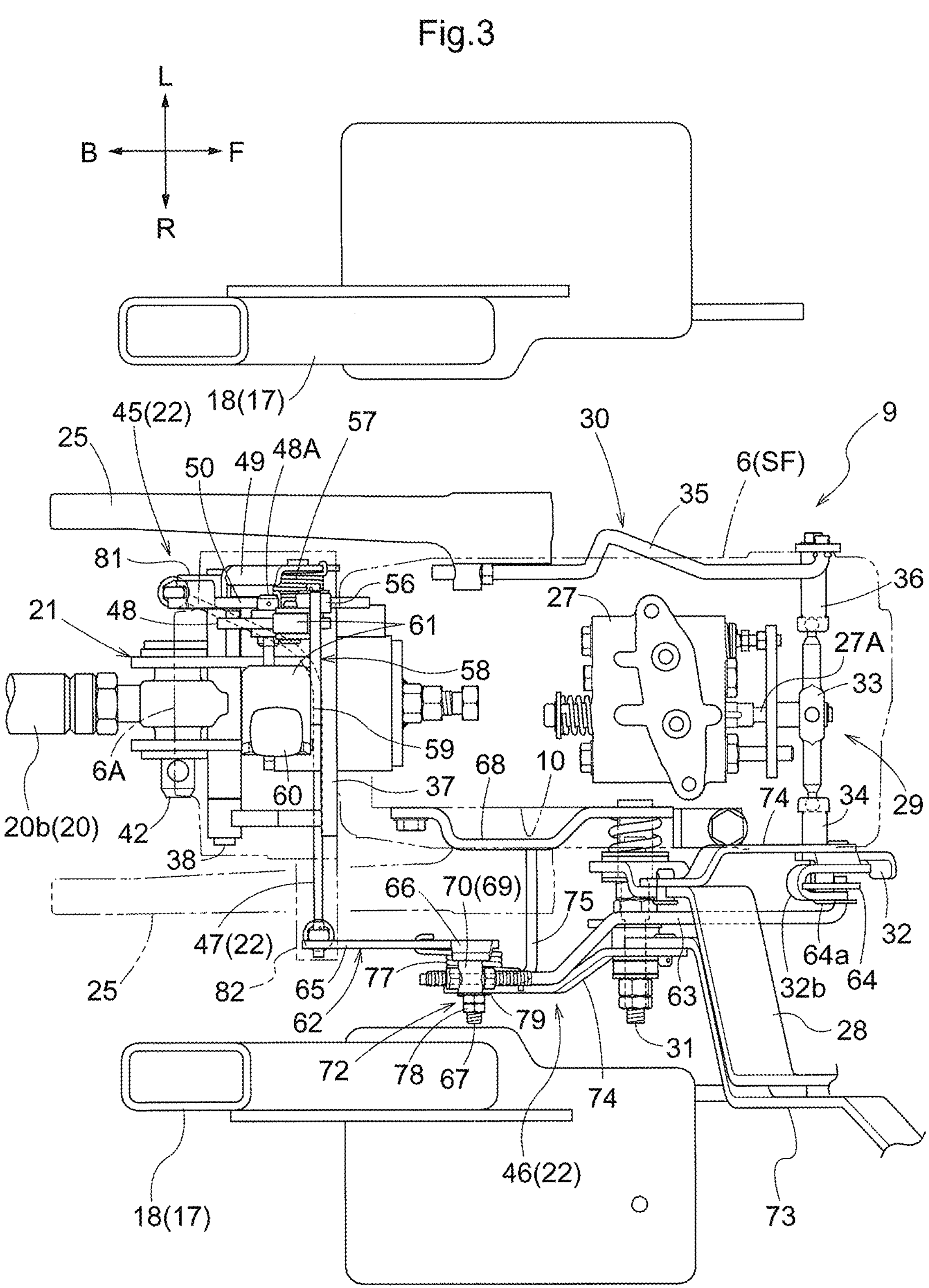
FIG. 3 is a plane view of a principal portion illustrating the configurations of the lifting and lowering driver and the mechanical linkage.
Figure 8:
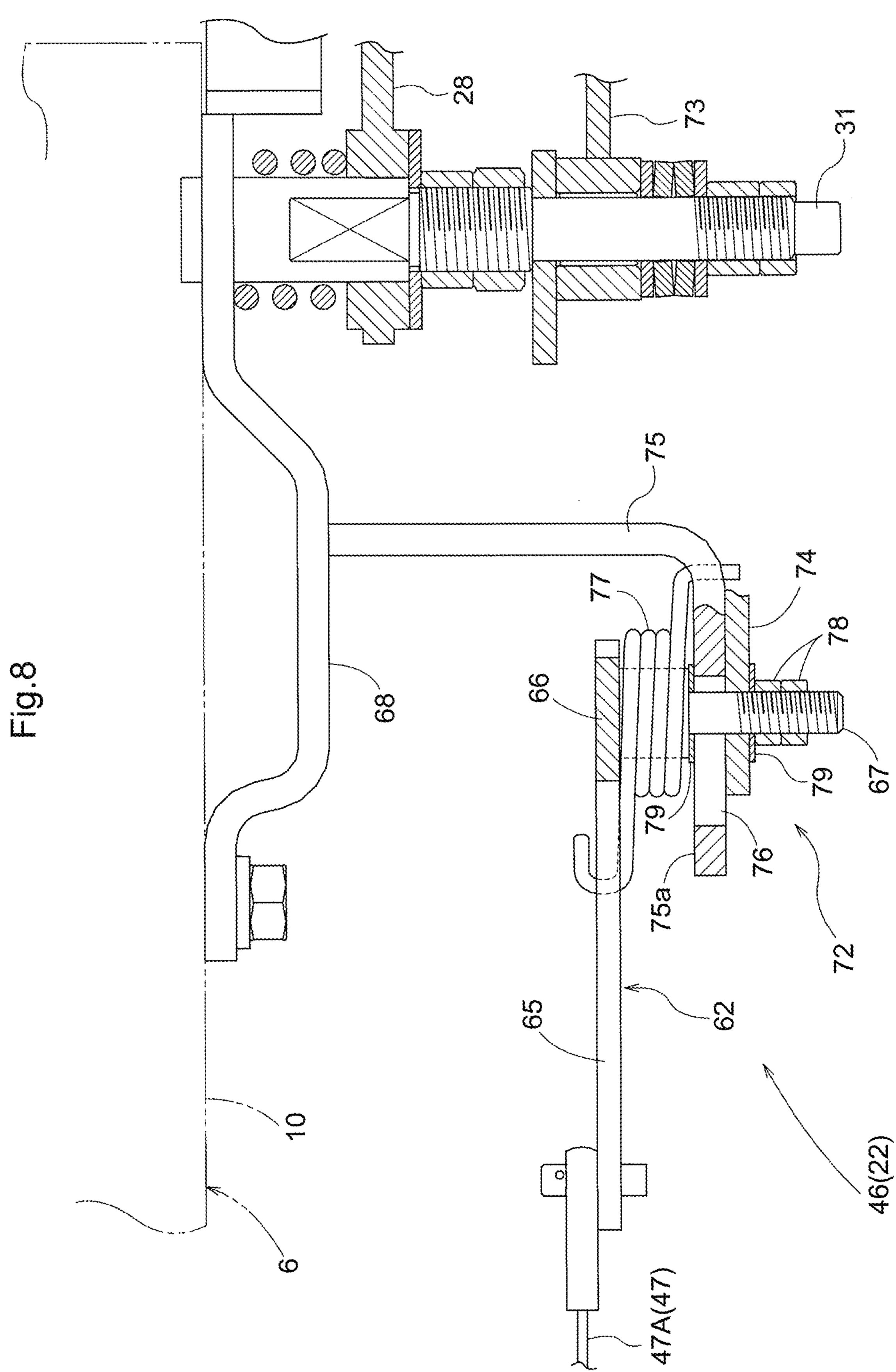
FIG. 8 is a transverse plane view of a principal portion illustrating the configuration of the mechanical linkage.

As illustrated in FIGS. 3, 8, the support bracket 75 is fixed to the side wall of the back support case 10 and is bent in a substantially L-shape in plan view toward the outside. An elongated hole 76 elongated in the forward and backward direction is formed in a vertical surface 75*a* on the outermost side of the support bracket 75. The lateral spindle 67 is inserted through the elongated hole 76, and the lateral spindle 67 is movable in the forward and backward direction along the elongated hole 76.

The push and pull of the operator 74 with the swing operation of the sensitivity adjustment lever 73 changes the position of the lateral spindle 67 forward and backward along the elongated hole 76. The gap between the actuating arm 64 and a linkage portion 32*b* of the operation arm 32 is changed interlocking with the above, and the actuation sensitivity when the spool 27A of the hydraulic control valve 27 is interlocked with the load detector 21 can be adjusted.

As illustrated in FIG. 7, the linkage portion 32*b* of the operation arm 32 is provided in a substantially U-shape in plan view, and the actuating arm 64 is rotatably supported by a spindle 64*a* while positioned inside the linkage portion 32*b*. The operation of the sensitivity adjustment lever 73 changes the relative attitude (reference attitude) of the actuating arm 64 and the operation arm 32 when no traction load is applied. When the actuating arm 64 swings from the reference attitude interlocking with the load detector 21, the state can be switched in response to a change in the reference attitude between a state in which the operation arm 32 is sensitively actuated and a state in which the responsiveness is low and the sensitivity is low.

As illustrated in FIG. 8, a spiral spring 77 is provided which rotates and biases the linkage 62 to the lowering operation side while being externally inserted into the lateral spindle 67. A spiral spring 77 is provided inward in the right-left direction of a vertical surface 75*a* of the support bracket 75. The spiral spring 77 is configured to rotate and bias the linkage 62 such that the spool 27A of the hydraulic control valve 27 is directed toward the lowering position, i.e., the first relay arm 65 is directed upward.

As illustrated in FIGS. 3, 7, the operator 74 preferably has a strip shape and is foldable at a middle portion such that the front side is positioned inward in the right-left direction and the back side is positioned inward in the right-left direction. The front side portion to which the sensitivity adjustment lever 73 is connected is positioned inward in the right-left direction and has an attitude along the forward and backward direction. The back side portion to which the lateral spindle 67 is connected is positioned outward in the right-left direction and has an attitude along the forward and backward direction. An intermediate portion between the front side portion and the back side portion has an oblique attitude directed inward in the right-left direction toward the front side.

The operator 74 is positioned outward in the right-left direction of the vertical surface 75*a* of the support bracket 75 to be supported by the lateral spindle 67, and held in position by fastening nuts 78 (see FIG. 8).

The spiral spring 77 is provided to be positioned inward in the right-left direction of the back side portion in the operator 74. The sensitivity adjustment lever 73 is provided such that a base end is positioned inward in the right-left direction of the front side portion in the operator 74 and an upper side is provided to be positioned outward in the right-left direction. Thus, the sensitivity adjustment lever 73 is provided to be positioned outward in the right-left direction of the front side portion in the operator 74.

The lateral spindle 67 is configured to rotate integrally with the linkage 62. A sliding portion between the operator 74 and a rotating portion of the support bracket 75 includes a high abrasion resistant washer 79 to prevent abrasion.

The sensitivity adjustment lever 73 and the height setting lever 28 include upper side portions arranged at positions closer to each other in the right-left direction to facilitate the operation from the driving section 7. The sensitivity adjustment lever 73 and the height setting lever 28 include base end side portions separated from each other along the axis direction (right-left direction) of the lever spindle 31. The push and pull rod 63 is provided to pass through the separated portion. The push and pull rod 63 is bendable at a middle portion in the forward and backward direction to pass between the base end side portions of the sensitivity adjustment lever 73 and the height setting lever 28. Thus, the second linkage 46 is configured to be as compact as possible in the width in the right-left direction by rationally arranging the members.

As illustrated in FIGS. 2, 4, 6, and 10, the operation cable 47 includes an inner cable 47A and an outer cable 47B externally inserted into and supporting the inner cable 47A to be slidable. The upstream end on the load detector 21 side of the operation cable 47 (hereinafter simply referred to as an upstream end), specifically the upstream end of the inner cable 47A, is connected to the lower arm 53 of the swing operator 50 in the first linkage 45. The downstream end on the lifting and lowering driver 9 side of the operation cable 47 (hereinafter simply referred to as a downstream end), i.e., the downstream end of the inner cable 47A, is connected to the first relay arm 65 of the linkage 62 in the second linkage 46.

As described above, the lower arm 53 of the swing operator 50 and the first relay arm 65 of the linkage 62, to which the operation cable 47 is connected, are configured to swing upward and downward with the horizontal attitude in between, and can be prevented from strongly sliding against the end of the outer cable 47B to be abraded even when the inner wire 46A slides with the swing of the lower arm 53 or the first relay arm 65.

As illustrated in FIG. 4, the upstream end of the outer cable 47B is supported by an outer receiving member 81 fixed to the bracket 49. The bracket 49 is fixed to and supported by the back frame 37. The downstream end of the outer cable 47B is supported by an outer receiving member 82 as a bracket fixed to and extended from the transmission case 6.

A connector between the downstream end of the inner cable 47A and the first relay arm 65 is positioned closer to the vehicle body front side with respect to a connector between the upstream end of the inner cable 47A and the lower arm 53.

The upstream end of the operation cable 47 is provided to extend along the upward-downward direction. More specifically, the upstream end of the inner cable 47A and the outer receiving member 81 are provided at positions separated from each other in the upward-downward direction to substantially overlap with each other in plan view. The downstream end of the operation cable 47 is provided to extend along the upward-downward direction. More specifically, the downstream end of the inner cable 47A and the outer receiving member 82 are provided at positions separated from each other in the upward-downward direction to substantially overlap with each other in plan view.

As illustrated in FIGS. 2, 4, and 5, the operation cable 47 is provided such that the upstream end on the load detector 21 side in the operation cable 47 and the downstream end on the lifting and lowering driver 9 side in the operation cable 47 extend along the upward-downward direction. As illustrated in FIGS. 1, 3, the operation cable 47 is provided such that the downstream end is positioned ahead of the upstream end. The downstream end in the operation cable 47 is provided to be positioned on the vehicle body front side relative to a rear wall 6A of the transmission case 6.

As illustrated in FIG. 4, the operation cable 47 is extended downward from a first position higher than the PTO shaft 13 and extended to a second position higher than the PTO shaft 13 passing through under the PTO shaft 13.

More specifically, the operation cable 47 is routed such that the upstream end and the downstream end are connected and supported by the outer receiving members 81, 82, respectively, in upper side portions of the PTO shaft 13, and a middle portion passes through the region under the PTO shaft 13.

The operation cable 47 is routed along the rear wall 6A of the transmission case 6. The rear wall 6A includes a lock 83 in a place corresponding to the region under the PTO shaft 13 of the rear wall 6A, and an intermediate portion of the operation cable 47 is locked and held by the lock 83. Thus, the operation cable 47 is curved with a large curvature radius passing through the region under the PTO shaft 13 from the first linkage 45 toward the second linkage 46.

The lock 83 is provided to have a lateral length equal or substantially equal to the right-and-left width of the rear wall 6A of the transmission case 6. The attitude of the operation cable 47 can be stably held by locking the intermediate portion positioned on the lower side of the operation cable 47 over a wide range in the right-left direction as described above.

OTHER EXAMPLE EMBODIMENTS

Hereinafter, other example embodiments are listed.

A configuration may be acceptable in which the operation cable 47 is provided from the connection point to the first linkage 45 to the connection point to the second linkage 46 passing through the region under the vehicle body frame SF or provided to pass above the vehicle body frame SF.

A configuration may be acceptable in which the operation cable 47 extends in the forward and backward direction or extends in the right-left direction from the connection point to the first linkage 45 or the connection point to the second linkage 46.

A configuration may be acceptable in which the operation cable 47 is interlockingly linked with the load detector 21 without the swing operator 50.

The mechanical linkage 22 may be collectively provided on one side in the right-left direction of the vehicle body frame SF or collectively provided on the other side in the right-left direction of the vehicle body frame SF, rather than being divided to the right and left. In this case, the operation cable 47 may be routed to extend out from one side in the right-left direction of the vehicle body, and then returns to one side in the right-left direction of the vehicle body after the intermediate portion passes through the region under the PTO shaft 13.

The operation cable 47 may be routed such that the intermediate portion connecting the first linkage 45 and the second linkage 46 passes above the PTO shaft 13.

A configuration may be acceptable in which the load detector 21 is supported to be swingable about the upper lateral spindle or swingable about the longitudinal axis.

As the actuator driving the three-point linkage 20 to lift and lower, electric actuators, such as electric cylinders or electric motors, may be used in place of the hydraulic cylinder.

The configuration of the tractor can be variously altered. For example, a configuration with a crawler running gear in place of the right and left rear wheels may be acceptable or a configuration with a crawler running gear in place of the right and left front wheels and the right and left rear wheels may be acceptable. An electric configuration with an electric motor in place of the engine may be acceptable or a hybrid configuration with an engine and an electric motor may be acceptable.

A configuration may be acceptable in which the push and pull rod 63 is operated by one swing arm, a spindle rotating integrally with the swing arm, and a swing body separate from the swing arm, in place of the linkage 62 integrally formed in a substantially L-shape.

A configuration may be acceptable in which the first relay arm 65 (swing arm) swings only in a region above the horizontal attitude or only in a region under the horizontal attitude.

A configuration may be acceptable in which the upstream end of the outer cable 47B is supported by a separately provided dedicated support.

The operation cable 47 may be routed to pass above the PTO shaft 13.

A configuration may be acceptable in which a push and pull rod is operated by an upper swing arm, a spindle rotating integrally with the upper swing arm, and a second swing arm separate from the upper swing arm, in place of the linkage 62 having the second relay arm 66 (upper swing arm) and the first relay arm 65 (second swing arm) integrally formed in a substantially L-shape.

The back protection frame 17 does not have to be provided.

A configuration may be acceptable in which the interlocking linkage is achieved using an operation cable configured to perform a push and pull operation in place of the rod 63 extending in the forward and backward direction.

The screw type interval adjuster 69 may be provided in the connection point between the push and pull rod 63 and the actuating arm 64. The push and pull rod 63 may be provide with a turnbuckle mechanism in a middle portion to change the length of the rod itself in place of one provided in the connection point between the push and pull rod 63 and the second relay arm 66 and in the connection point between the push and pull rod 63 and the actuating arm 64.

A configuration may be acceptable in which the whole mechanical linkage 22 is defined by a linkage without the operation cable 47.

The mechanical linkage 22 may be collectively provided on one side in the right-left direction of the vehicle body frame SF or on the other side in the right-left direction of the vehicle body frame SF, rather than being divided to the right and left.

The operator 74 may be one having a back side portion positioned inward in the right-left direction and a front side portion positioned outward in the right-left direction or may be one having a front side portion and a back side portion positioned on substantially the same position in the right-left direction. The operator 74 may also be a rod.

A configuration without the high abrasion resistant washer 79 may be acceptable.

Example embodiments of the present invention are applicable to tractors each including a three-point linkage to which an implement is movably attached.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A tractor comprising:
a vehicle body frame;
a three-point linkage connected to a back portion of a vehicle body of the tractor to be swingable upward and downward and allowing attachment of an implement;
a lifting and lowering driver to lift and lower the three-point linkage;
a load detector to swing according to a traction load of the implement during ground work performed by the implement while the implement is towed by the vehicle body; and
a mechanical linkage to transmit a swing amount of the load detector to the lifting and lowering driver;
the mechanical linkage including:
a first linkage on one side in a right-left direction of the vehicle body frame and interlockingly linked with the load detector;
a second linkage on another side in the right-left direction of the vehicle body frame and interlockingly linked with the lifting and lowering driver; and
an operation cable interlockingly linking the first linkage and the second linkage, wherein the operation cable transmits the swing amount of the load detector to the lifting and lowering driver during the ground work performed by the implement while the implement is towed by the vehicle body.

2. The tractor according to claim 1, wherein
the first linkage includes a swing operator to swing with swinging of the load detector about a swing axis different from a swing axis of the load detector; and
the operation cable includes an end on a side of the load detector and connected to the swing operator.

3. The tractor according to claim 1, wherein the operation cable extends along an upward-downward direction from a connected point in each of a connection point to the first linkage and a connection point to the second linkage.

4. The tractor according to claim 1, wherein the operation cable extends from the connection point to the second linkage passing through a region behind the vehicle body frame from the connection point to the first linkage.

5. A tractor comprising:
a vehicle body frame;
a three-point linkage connected to a back portion of a vehicle body of the tractor to be swingable upward and downward and allowing attachment of an implement;
a lifting and lowering driver to lift and lower the three-point linkage;
a load detector to swing according to a traction load of the implement during ground work performed by the implement while the implement is towed by the vehicle body;
a mechanical linkage to transmit a swing amount of the load detector to the lifting and lowering driver;
a transmission case in a back portion of the vehicle body frame; and
a power takeoff (PTO) shaft protruding backward from a back portion of the transmission case to output power to be transmitted to the implement;
the mechanical linkage including an operation cable operable according to the swing amount of the load detector;
the operation cable extending downward from a first position higher than the PTO shaft to a second position higher than the PTO shaft passing through under the PTO shaft, wherein the operation cable transmits the swing amount of the load detector to the lifting and lowering driver during the ground work performed by the implement while the implement is towed by the vehicle body.

6. The tractor according to claim 5, wherein
the operation cable is routed along a rear wall of the transmission case;
a lock is in a region under the PTO shaft of the rear wall; and
an intermediate portion of the operation cable is locked and held by the lock.

7. The tractor according to claim 6, wherein the operation cable is provided such that an end on a side of the lifting and lowering driver in the operation cable is positioned ahead of the rear wall of the transmission case.

8. The tractor according to claim 5, wherein the operation cable is provided such that an end on a side of the load detector in the operation cable is positioned on one side in a right-left direction of the transmission case and the end on the side of the lifting and lowering driver in the operation cable is positioned on another side in the right-left direction of the transmission case.

9. The tractor according to claim 5, wherein the operation cable is provided such that the end on the side of the load detector in the operation cable and the end on the side of the lifting and lowering driver in the operation cable extend along an upward-downward direction.

10. A tractor comprising:
a three-point linkage connected to a back portion of a vehicle body of the tractor to be swingable upward and downward and allowing attachment of an implement;
a lifting and lowering driver to lift and lower the three-point linkage;
a load detector to swing according to a traction load of the implement during ground work performed by the implement while the implement towed by the vehicle body; and
a mechanical linkage to transmit a swing amount of the load detector to the lifting and lowering driver;
the mechanical linkage including an operation cable operable according to the swing amount of the load detector;
the operation cable being provided such that an upstream end on a side of the load detector in the operation cable and a lower downstream end on a side of the lifting and lowering driver in the operation cable extend along an upward-downward direction and the downstream end is positioned ahead of the upstream end, wherein the operation cable transmits the swing amount of the load detector to the lifting and lowering driver during the ground work performed by the implement while the implement is towed by the vehicle body.

11. The tractor according to claim 10, wherein
the mechanical linkage includes a swing operator to swing with swinging of the load detector about a swing axis different from a swing axis of the load detector;
the upstream end of the operation cable is connected to the swing operator; and
the swing operator is swingable upward and downward with a horizontal attitude in between with an operation of the operation cable extending along the upward-downward direction.

12. The tractor according to claim 10, wherein
the mechanical linkage includes a first relay arm to which the downstream end in the operation cable is connected; and the first relay arm is swingable upward and downward with a horizontal attitude in between with the operation of the operation cable extending along the upward-downward direction.

13. The tractor according to claim 12, further comprising:
a second relay arm swingable with the first relay arm; and
an interlock interlockingly linked with the second relay arm; wherein
the second relay arm is swingable forward and backward with the operation of the operation cable to move the interlock forward and backward and transmit the swing amount of the load detector to the lifting and lowering driver.

14. The tractor according to claim 10, wherein
the mechanical linkage includes a swing operator swingable with swinging of the load detector about a swing axis different from a swing axis of the load detector;
a support frame swingably supporting the load detector is provided to be supported by a vehicle body frame;
a support swingably supporting the swing operator is provided to be supported by the support frame;
the operation cable includes an inner cable and an outer cable externally inserted into and supporting the inner cable to be slidable; and
an upstream end of the outer cable is supported by the support such that a position is fixed.

15. The tractor according to claim 10, wherein
the operation cable includes the inner cable and the outer cable externally inserted into and supporting the inner cable to be slidable; and
a bracket supporting a downstream end of the outer cable is provided to be supported by the vehicle body frame.

16. A tractor comprising:
a three-point linkage connected to a back portion of a vehicle body of the tractor to be swingable upward and downward and allowing attachment of an implement;
a lift arm to lift and lower the three-point linkage;
a lifting and lowering driver to lift and lower the lift arm;
a load detector to swing according to a traction load of the implement during ground work performed by the implement while the implement is towed by the vehicle body; and
a mechanical linkage to transmit a swing amount of the load detector to the lifting and lowering driver;
the lifting and lowering driver including:
an actuator; and
a controller configured or programmed to control an actuation of the actuator;
the mechanical linkage including an operation linkage to operate the controller in response to a swing amount of the load detector, and an operation cable operable according to the swing amount of the load detector;
the operation linkage extending through a position lateral to the lift arm, wherein the operation cable transmits the swing amount of the load detector to the lifting and lowering driver during the ground work performed by the implement while the implement is towed by the vehicle body.

17. The tractor according to claim 16, wherein
the vehicle body includes a protection frame in a back portion of the vehicle body;
the protection frame includes right and left legs positioned on lateral sides of the lift arm; and
the operation linkage passes between the lift arm and the legs.

18. The tractor according to claim 16, wherein
the operation linkage includes an upper swing arm to swing in response to the swing amount of the load detector;
a rod extending in a forward and backward direction connected to the upper swing arm and operated to be pushed and pulled in response to swing of the upper swing arm; and
a lower swing arm connected to a lower side of the rod to swing with the push and pull operation of the rod.

19. The tractor according to claim 18, further comprising:
an interval adjuster to change and adjust an interval between a connection point between the rod and the upper swing arm and a connection point between the rod and the lower swing arm.

20. The tractor according to claim 18, further comprising:
a lateral spindle extending in a lateral direction; and
a second swing arm to swing with the upper swing arm about an axis of the lateral spindle; wherein
the upper swing arm is positioned to transmit the swing amount transmitted to the second swing arm to the rod; and
a support bracket rotatably supports the lateral spindle and a spiral spring to be externally inserted into the lateral spindle and rotates and biases the upper swing arm to a lowering operation side.

21. The tractor according to claim 20, wherein
the support bracket includes an elongated hole extending along the forward and backward direction of the vehicle body;
the lateral spindle is supported by the support bracket to be rotatable and movable in the forward and backward direction while passing through the elongated hole;
a manually operable adjustment lever is provided on a forward side of the vehicle body of the lateral spindle; and
a strip-shaped operator connects the adjustment lever and the lateral spindle;
actuation sensitivity to the swing amount of the load detector in the mechanical linkage is changeable and adjustable by operating the adjustment lever to change a position of the lateral spindle in the forward and backward direction; and
the operator is foldable such that a back side portion to which the lateral spindle is connected in the operator is positioned outward in a lateral width direction of the vehicle body and a front side portion to which the adjustment lever is connected in the operator is positioned inward in the lateral width direction of the vehicle body.

22. The tractor according to claim 21, wherein
the spiral spring is provided to be positioned inward in the lateral width direction of the vehicle body of the back side portion in the operator; and
the adjustment lever is provided to be positioned outward in the lateral width direction of the vehicle body of the front side portion in the operator.

23. The tractor according to claim 21, wherein a sliding portion between the operator and the support bracket includes an abrasion-resistant washer.

* * * * *